April 10, 1945.  M. D. PARMENTER  2,373,498
EXAMINATION MATERIAL
Filed March 19, 1943
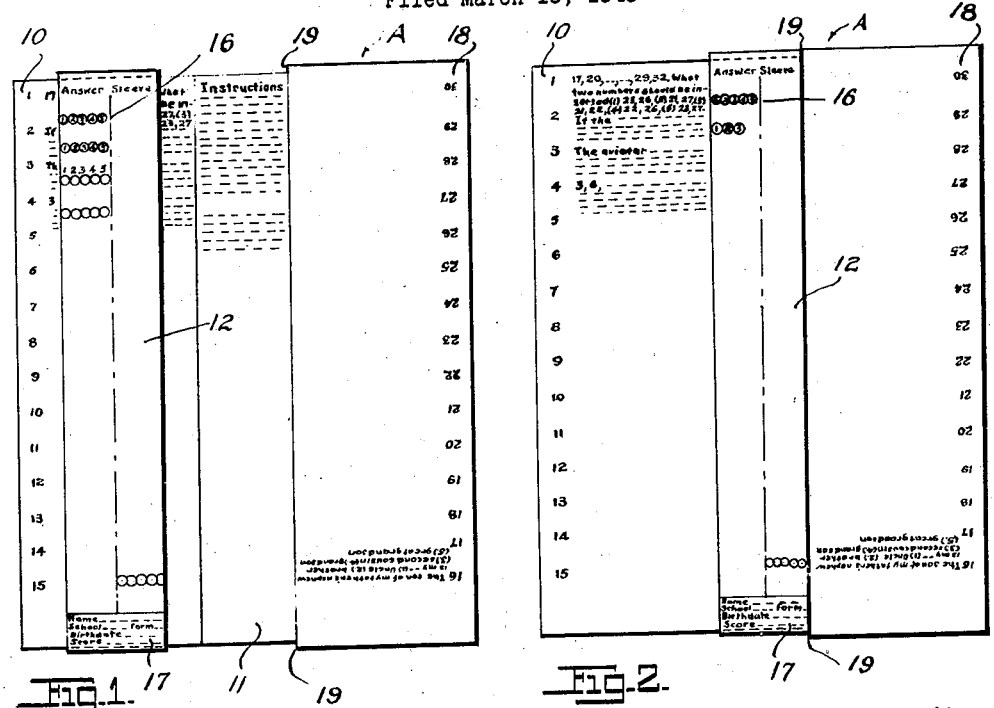
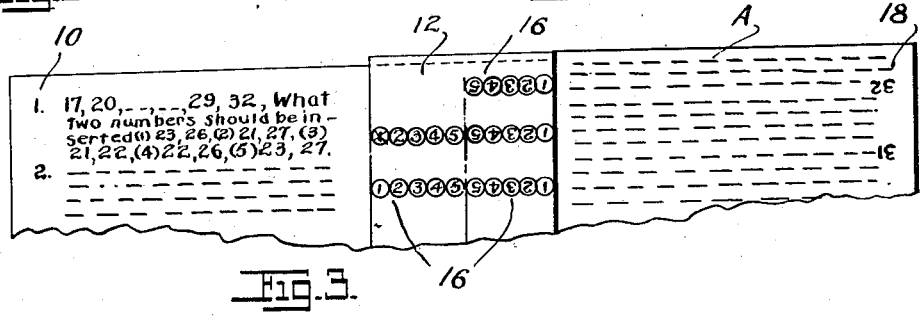
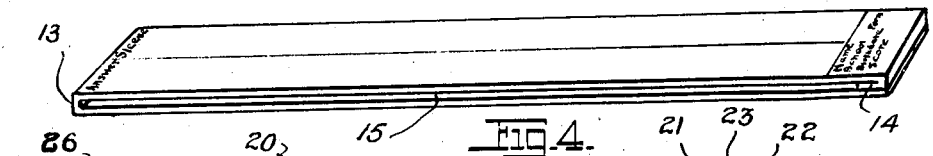
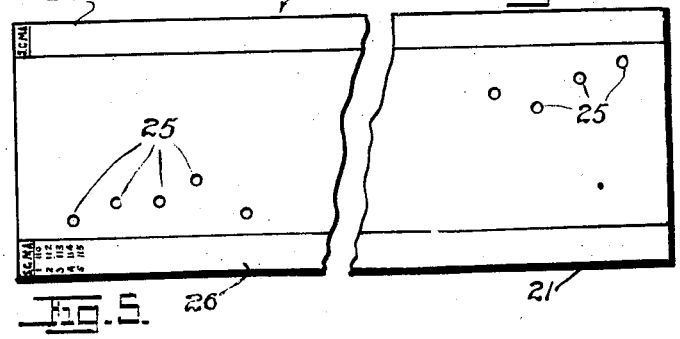
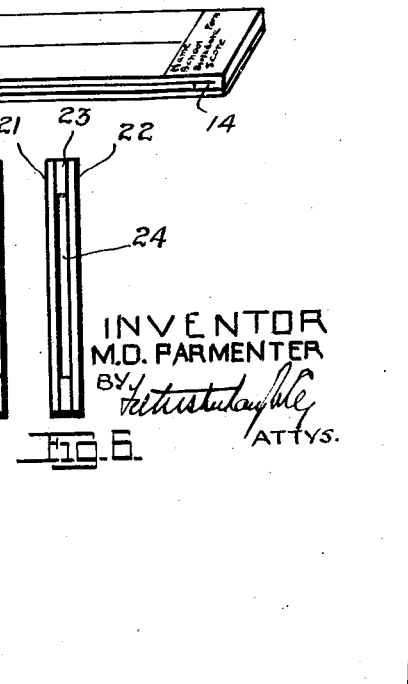
INVENTOR
M. D. PARMENTER
BY
ATTYS.

Patented Apr. 10, 1945

2,373,498

UNITED STATES PATENT OFFICE 2,373,498

EXAMINATION MATERIAL

Morgan D. Parmenter, Toronto, Ontario, Canada

Application March 19, 1943, Serial No. 479,726

6 Claims. (Cl. 35—48)

This invention relates to examination material and in particular to a quick and efficient means for answering examinations and determining the correctness of the answers given.

A number of proposals have been made in this general field employing special papers for answers which may be used along with the examination paper and with provision for indicating the answer to the question. Moreover, it has previously been proposed to provide a means for facilitating examination of the answered papers more quickly to determine the correctness of the answers. Prior proposals have had several disadvantages however.

On the one hand, the use of a separate answer sheet along with the examination paper does not lend to quick and efficient results since the student must refer to the questions and back to the answer paper and, therefore, may use a wrong section or sections thereof for the answer to a question or questions.

On the other hand, some at least, of the proposals for examining the written paper quickly to determine whether the correct answers have been given have been of such character that if the paper examined is not carefully located and maintained in a given arrangement with the examining device proposed, the answers to questions may be related to other questions than those with which they are concerned and the paper may be examined inaccurately and may have to be re-examined.

I have found that simple examination material may be devised which will avoid the disadvantages of the prior art and greatly facilitate examinations, both from the point of view of the student answering them and the examiner marking them. It is, therefore, an object of the present invention to provide a simple type of examination material which will co-relate the questions accurately.

A further object of the invention is to provide material of this kind wherein the examination paper may be of restricted size more convenient to handle.

A still further object of the invention is to provide examination material wherein the answers to the examination may be examined quickly and with accuracy.

A still further object of the invention is to provide examination material which may be produced at very low cost per examinee.

With these and other objects in view, the invention generally comprises examination material including a sheet having printed thereon examination questions, and answer recording means, having sections for answers thereon corresponding with the location of the examination questions, adapted to straddle the examination sheet to position the answer sections in co-relation to the questions, said answer recording means being capable of being slipped off the examination sheet when answers are recorded, to form the complete examination paper for marking. Preferably the answer recording means embodies an elongated narrow sleeve-like device which will slip over the examination sheet and be held in a co-related manner, whereas the invention also includes the provision of a sheath for receiving the answer sleeve so that it will always be held in accurate position once fully projected into the sheath, the correct answers being determined through openings in the sheath which will check with the correct location of the answer.

The invention will be clearly understood by reference to the following detailed specification taken in conjunction with the accompanying drawing.

In the drawing:

Fig. 1 is a plan view of a preferred form of examination paper with the answer recording means disposed over the first series of questions leaving open to view the centre panel of the paper which may carry instructions.

Fig. 2 is a plan view of the examination paper with the answer recording means slipped over the centre panel in its normal position exposing the answer sections in co-relation to the questions on the paper.

Fig. 3 is an enlarged fragmentary view of the top part of the examination paper with the answer recording means disposed as in Fig. 2.

Fig. 4 is a perspective view of the preferred form of answer recording means.

Fig. 5 is a plan view of the sheath for receiving the answer recording means; and Fig. 6 is an end view of Fig. 5 showing the opening in one end of the sheath into which the answer recording means may be projected.

Referring to the drawing, A indicates an examination paper as a whole which may be printed on cardboard and carries a series of numbered questions 10. To one side of the questions a panel 11 is provided for receiving suitable answer recording means, straddling the examination sheet which preferably takes the form of an answer sleeve 12. This may be constructed and preferably is, as shown in Fig. 4, made from a single piece of material bent upon itself as at 13 provided with a turned-in end 14 leaving a central passageway therethrough 15 to form a complete sleeve-like member. The sleeve is slid over one edge of the examination sheet and in the normal course may initially overlie the questions, while the pupil may consider instructions or other data placed upon the panel 11.

When the examination is to be commenced, the student slides the sleeve 12 to overlie the panel 11 and by reason of the fact that the width of the passageway 15 substantially corresponds to the length of the examination sheet, the answer sleeve will be positioned on the panel 11 so as accurately to position the answer sections 16 in co-relation to the questions to which they pertain. As will be noted, particularly in Fig. 3, the answer sections 16 contain individual spaces preferably numbered, either within or directly outside the space, to correspond with a number of possible answers to the questions asked, one of which is to be marked by the pupil as the correct in his estimation. In this way by going through all the questions and marking the appropriate space on the answer sections, the student will complete the examination. Moreover, by reason of the fact that the answer recording means is disposed directly beside the questions, and the answer sections appear directly opposite to the questions, the student's work is facilitated. This substantially eliminates the possibility of recording the answer to one question in the answer section intended for another question since the questions and answer sections, are immediately adjacent to one another and the student's attention is not distracted by having to go to a separate paper to record the answers.

The answer recording means is preferably in the form of an elongated relatively narrow strip which forms the sleeve 12 in the preferred construction and contains in addition to the answer sections, a place such as 17 for recording the student's name and other necessary particulars in this connection.

Preferably the examination sheet is formed, as shown in Figs. 1, 2 and 3, wherein the panel 11 is disposed between two series of questions disposed on each side of the sheet, the series of questions 10 and the series of questions 18, the first series running in chronological order from the top to the bottom of the sheet, and the second series 18 running in chronological order from the bottom to the top of the sheet, so that it is necessary to rotate or reverse the sheet after doing the first series of questions to attempt the second series of questions.

Moreover, in this connection the answer recording means is preferably divided longitudinally substantially along its centre and the answer section for the second series of questions is likewise reversed and runs from the bottom to the top. Consequently, when the sheet is rotated to place the second series of questions in chronological order running from the top to the bottom of the sheet, the answer recording sections for the questions will likewise be placed in this order. In this way the second series of questions are not apparent to the student until he has finished the first series of questions and, therefore, the second series of questions will not tend to divert the student's attention when dealing with the first series, the same being true in relation to the first series when the second series is being considered. The same arrangement can be employed on the back of the sheet so that in effect such sheet may contain four series of questions and the answer recording means will have its back marked to provide the necessary answer sections to correspond.

Preferably the sheet is provided with a means to locate the answer recording means accurately on the sheet as it is slid across the sheet and the preferred form of stop means embodies the projecting shoulders 19 against which the ends of the sleeve will engage to stop the recording means directly over the panel 11 and, by reason of the sleeve construction, in appropriate co-relation to the questions. Alternatively, however, one end of the answer sleeve might be left free so that the sections are only connected together at the opposite end and still achieve the advantages of this invention, although a complete sleeve is the preferred form of construction.

The use of a relatively narrow elongated sleeve for recording the answers has other advantages, the principal one being that it forms the complete answer paper for an examinee which is particularly convenient to handle, tends to save material, and permits the examination sheet to be used over and over again. Moreover, it also lends itself to quick surveying in combination with a means for examining the answers quickly and with accuracy.

To facilitate marking of the answers, I provide an answer examining sheath 20 which is of elongated character substantially corresponding to the length of the answer sleeve or answer recording means 12, being closed at one end and both sides, the upper and lower sections 21 and 22 being preferably spaced apart by the spacers 23 so as to form the passage 24 in the sheath to receive the answer recording means. The passage 24 is of a width substantially corresponding to the width of the answer recording sleeve and of a length substantially corresponding to the sleeve as above referred to, so that when the sleeve is projected into the sheath 20 until the upper end of the sleeve engages the end of the sheath, the answer sections 16 must be related to a series of holes 25 extending through the wall or walls of the sheath. These holes 25 are positioned so that they will register with the answer space of each section which corresponds to the correct answer to the question so that when the answer sleeve is projected into the sheath as above described, the examiner only requires to glance at the holes 25 and if he sees an X or mark in the space of each section below the hole in each case, he immediately knows that the answer is correct, but failing to find such marking he knows that the question has been answered wrongly. In this way by quickly going down the face of the sheath and noting whether or not a marking appears in each hole, the examinee's score may be quickly determined. If desired, the marginal edge portions 26 of the front and back faces of the sheath may carry indicia indicating the significance of raw scores in terms of percentile rank, mental age or general grading.

What I claim as my invention is:

1. Examination material comprising a sheet divided into three longitudinally extending panels to form two outside panels separated by an intermediate panel, the outside panels each bearing a series of questions to be answered, and answer recording means in the form of a sleeve designed to stradde the sheet and to be slid over the intermediate panel to divide each series of questions from the other, said answer sleeve having defined sections for answers thereon corresponding with the location of the questions on each of said outside panels and positioned in correlation to said questions when said sleeve overlies the intermediate panels, said answer sleeve when slipped off the sheet, after answers have been recorded thereon, forming the complete examination answer paper for marking.

2. Examination material as claimed in claim 1 in which stop means is provided on the sheet for locating said sleeve accurately in relation to the intermediate panel and each series of questions on the outside panels.

3. Examination material as claimed in claim 1 in which the series of questions on one outside panel occur successively, in predetermined order from top to bottom of the sheet, and the series of questions on the other outside panel occur in similar order from bottom to top of the sheet to render one series of questions normally unreadable until said sheet is reversed.

4. Examination material as claimed in claim 1 in which the intermediate panel carries data relating to the examination for the instruction of the person answering the examination, said sleeve forming slidable means for covering said data and demarking the examination questions therefrom.

5. Examination material comprising a single sheet of material divided into three longitudinally extending panels to form two outside panels separated by an intermediate panel, the outside panels each bearing a series of questions to be answered, an answer recording means in the form of a sleeve formed from two strips of material connected together at least at one end thereof and disconnected along their side edges whereby to straddle said sheet and slidable to overlie the intermediate panel and to divide each series of questions from the other, said answer sleeve having sections for answers thereon corresponding with the location of the questions on each of said outside panels and positioned in co-relation to said questions when said sleeve overlies the intermediate panels, projecting means on one edge of said sheet located adjacent to the line of division between one outside panel and the intermediate panel for stopping said sleeve accurately over said intermediate panel and in relation to each series of questions on the outside panels, said answer sleeve when slipped off the sheet, after answers have been recorded thereon, forming the complete examination answer paper for marking.

6. Examination material as claimed in claim 5 in which the sheet is extended at its top and bottom in an area coinciding with one outside panel to form, between said outside panel and the intermediate panel, shoulders forming means for stopping the answer sleeve at a position to overlie the intermediate panel, said answer sleeve being of a length shorter than the length of the extended part of the sheet, the strips of said answer sleeve being connected at both end edges to abut the said stop shoulders.

MORGAN D. PARMENTER.